(12) United States Patent  (10) Patent No.: US 8,205,557 B2
Moore  (45) Date of Patent: Jun. 26, 2012

(54) MOTORCYCLE TURNTABLE

(76) Inventor: Raymond Patrick Moore, Lexington, SC (US)

( * ) Notice: Subject to any disclaimer, the term of this patent is extended or adjusted under 35 U.S.C. 154(b) by 280 days.

(21) Appl. No.: 12/686,583

(22) Filed: Jan. 13, 2010

(65) Prior Publication Data

US 2010/0175578 A1 Jul. 15, 2010

Related U.S. Application Data

(60) Provisional application No. 61/144,475, filed on Jan. 14, 2009.

(51) Int. Cl.
*B60S 13/00* (2006.01)
(52) U.S. Cl. ............... 104/41; 104/40; 104/45
(58) Field of Classification Search ........... 104/35, 104/40, 41, 43, 44, 45, 46; 248/349.1; 410/1; 384/592, 596; 414/816
See application file for complete search history.

(56) References Cited

U.S. PATENT DOCUMENTS

| | | | | | |
|---|---|---|---|---|---|
| 659,707 | A | * | 10/1900 | Stephens | 104/46 |
| 984,967 | A | * | 2/1911 | Rasmus | 104/41 |
| 1,177,478 | A | * | 3/1916 | Brown | 104/41 |
| 1,556,556 | A | * | 10/1925 | Clayton | 104/41 |
| 1,562,853 | A | * | 11/1925 | Schonberger | 104/45 |
| 1,647,678 | A | * | 11/1927 | Willbanks | 104/41 |
| 1,718,811 | A | * | 6/1929 | Dillon | 104/41 |
| 1,969,398 | A | * | 8/1934 | Elliott | 104/41 |
| 1,969,634 | A | * | 8/1934 | Acuff | 104/41 |
| 2,044,031 | A | * | 6/1936 | Nieuwland | 104/44 |
| 2,566,634 | A | * | 9/1951 | Ready | 104/41 |
| 3,418,943 | A | * | 12/1968 | Teters | 104/44 |

* cited by examiner

*Primary Examiner* — Mark Le
(74) *Attorney, Agent, or Firm* — Samuel Alexander Long, Jr.

(57) ABSTRACT

An apparatus is provided to enable a personal transportation vehicle, such a motorcycle, to turn up to 180 degrees around while remaining in a confined, compact space. The apparatus comprises a lightweight inner platform rotating inside a lightweight, fixed, outer platform and uses translated power from the personal transportation vehicle as a motive force to turn the vehicle.

17 Claims, 3 Drawing Sheets

MOTORCYCLE TURNTABLE

RELATED APPLICATIONS

This application claims priority from U.S. Provisional application 61/144,475 filed Jan. 14, 2009.

FEDERALLY SPONSORED RESEARCH OR DEVELOPMENT

Not applicable.

REFERENCED OR INCORPORATED MATERIAL

Not applicable.

FIELD OF INVENTION

The present invention relates to the field of compact personal transportation vehicle storage. More specifically, the invention is a portable vehicle turntable that allows the operator of a personal transportation vehicle to drive onto the turntable and have the vehicle reverse direction via the motive power of the vehicle in a limit space environment.

SUMMARY OF THE INVENTION

The present invention is an apparatus that enables a personal transportation vehicle, such a motorcycle, to turn up to 180 degrees around while remaining in a confined, compact space. Moreover, the apparatus requires no independent or internal power source as the apparatus is operated via motive power supplied by the vehicle. The apparatus may fit in tight spaces such as garages and may be beneficial when space for turning a vehicle around is limited. Also, as many personal transportation vehicles lack a reverse gear, the apparatus enables the operator to turn the vehicle around and drive in the intended forward direction where she would not otherwise be able to do so.

Such features may afford many safety advantages as well. For instance, the apparatus may afford the ability to turn a vehicle around to exit on a busy street, rather than back out thereby offering improved personal safety.

As noted above, the apparatus requires no internal power source and no independent, third party, power source. Rather, the motive power is applied to the apparatus from the vehicle via the powered wheels of the vehicle. In the case of the motorcycle, this powered wheel is the rear wheel. The operator of the vehicle drives the vehicle onto the platform. The powered wheel(s) of the vehicle contacts a pair of shafts which are geared to rotate the platform until the operator ceases to apply power to the wheel(s) and the apparatus ceases to turn. Though the preferred embodiment is described with contemplation of use with motorcycles, the invention may be altered to suit other similar vehicles.

The apparatus functions as a turntable with two platforms, an inner platform and an outer platform. The outer platform is fixed and the inner platform rotates about a center point of the two platforms and is supported by ball bearings. The inner platform provides a surface upon which the vehicle rests and an opening for the wheel of the vehicle to contact the shafts which turn the inner platform.

The platform is designed to be lightweight and portable. In alternate embodiments, the platform has castors or other such wheels attached which may be raised or lowered for easy mobility. Also in alternate embodiments, the apparatus has a wall mounted connector to allow the platform to be lifted from the floor to a position against a wall while not in use.

DETAILED DESCRIPTION

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 1:
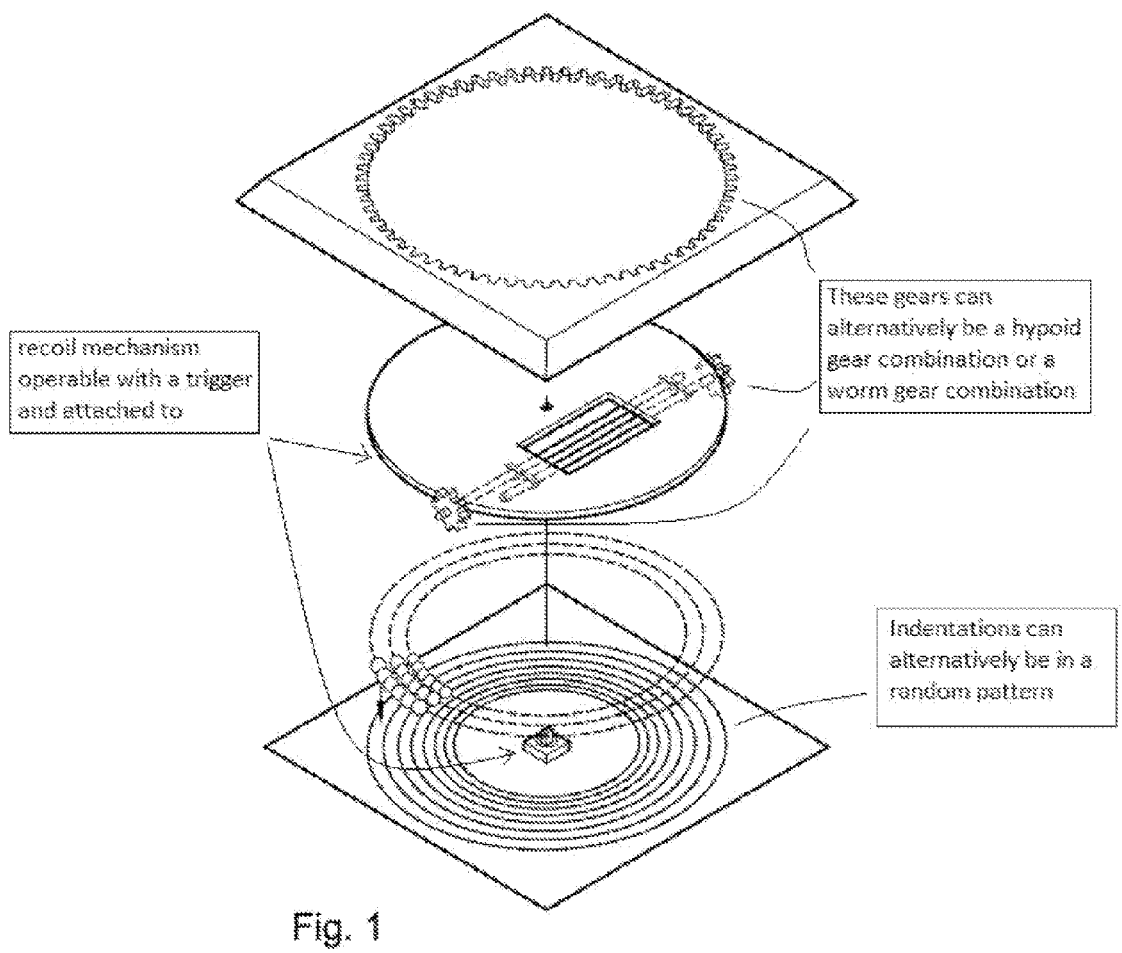
FIG. 1 is an exploded view of the apparatus.
Figure 2:
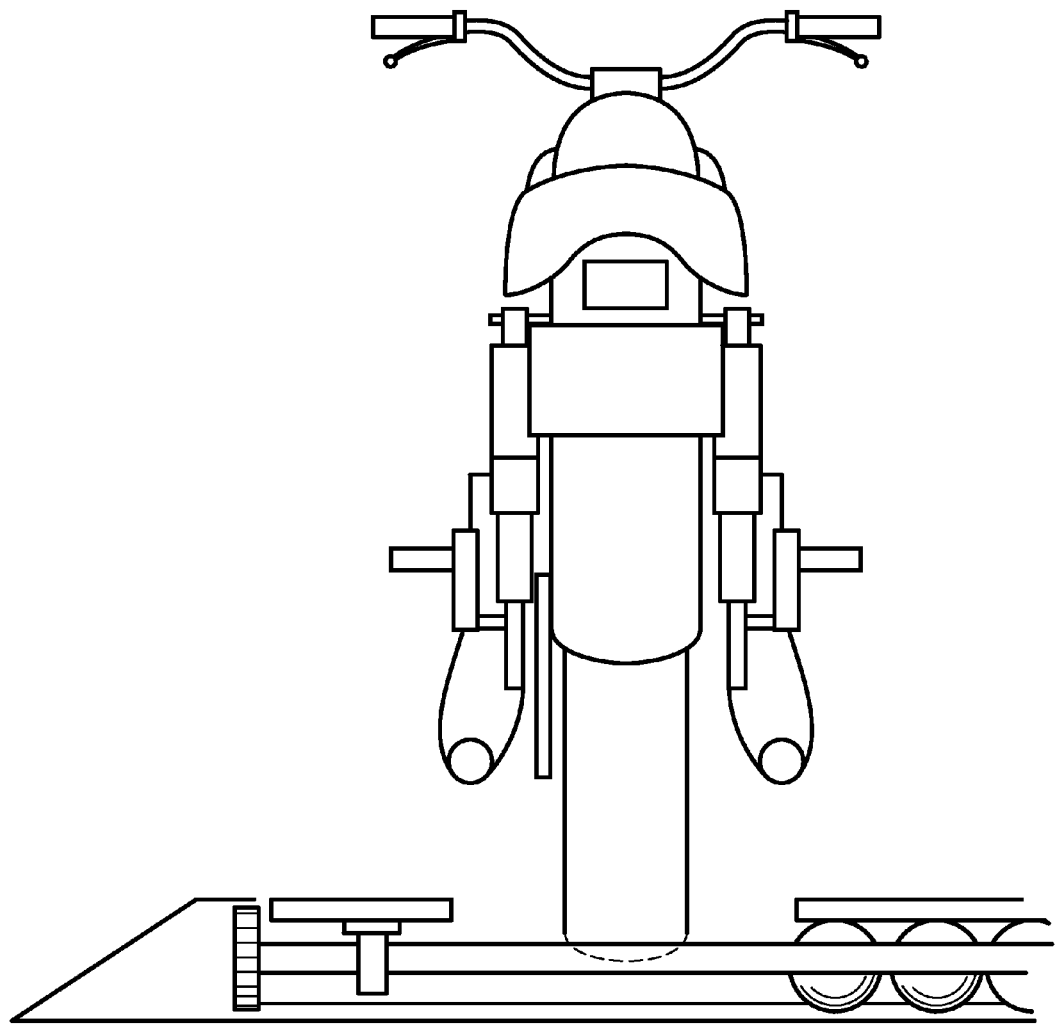
FIG. 2 is a cutaway view of the apparatus showing a motorcycle positioned on the inner platform with the tire touching the shafts.
Figure 3A:
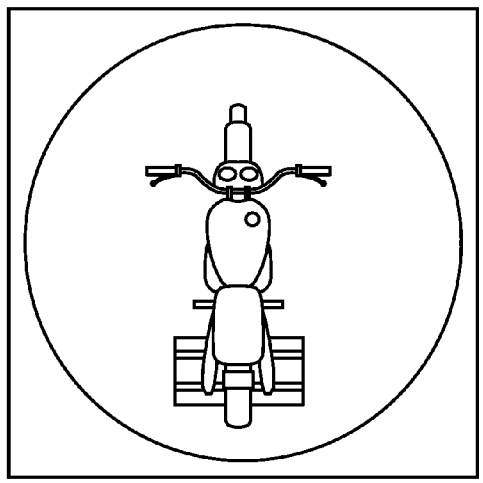
FIG. 3A is a top view of the apparatus in the initial rest position where the motorcycle has entered the apparatus.
Figure 3B:
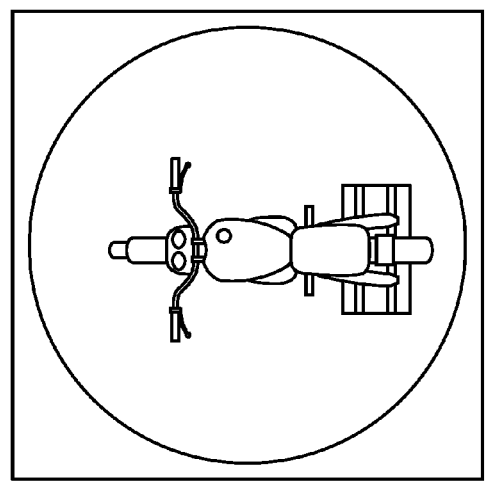
FIG. 3B is a top view of the apparatus in the 90 degree rotated position.
Figure 3C:
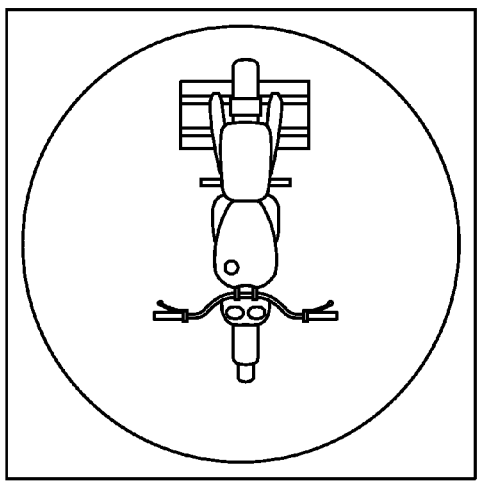
FIG. 3C is a top view of the apparatus in the 180 degree rotated position.
Figure 3D:
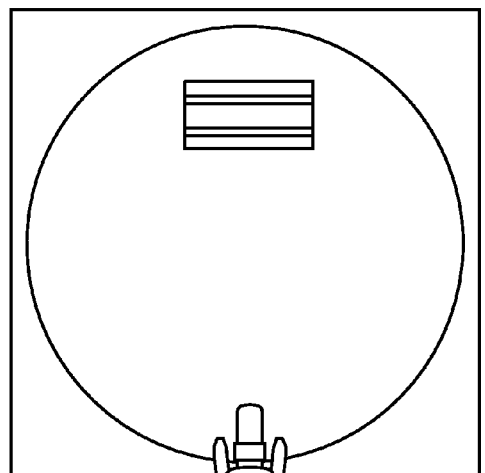
FIG. 3D is a top view of the apparatus in the 180 degree rotated position where the motorcycle has exited the apparatus.

The present invention is designed to allow a vehicle such as a motorcycle to do a 180 degree turn in a confined space such as a garage or a driveway. The invention is an apparatus that facilitates this stationary U-turn and comprises an inner and an outer platform. The outer platform operates in a fixed position and rests on the floor of the garage, driveway, or on the ground as the case may be. The apparatus operates from a rest position to a loaded position. The loaded position is that position where the motorcycle is on top of the inner platform and the rest position is that position where the motorcycle is off of the inner platform and the inner platform has rotated such that the shafts are nearest the entrance point of the motorcycle. The loaded position further comprises several sub positions as can be seen in FIG. 3A, FIG. 3B, FIG. 3C, and FIG. 3D. In these sub positions, the motorcycle has driven onto the inner platform. In FIG. 3A, the tires of the motorcycle have just contacted the shafts. In FIG. 3B the tires of the motorcycle have begun to drive the shafts and the platform has rotated about 90 degrees. In FIG. 3C the tires have continued to drive the shafts and the platform has rotated a further 90 degrees. In FIG. 3D the motorcycle is exiting the platform having been rotated 180 degrees from the point it entered the platform in the rest position.

The outer platform may be rectangular or round and is shown in the drawings as rectangular. The outer platform has a bottom, preferably made of sheet metal, and a top, preferably made out of plastic. The outer edges of the platform are sloped upward towards the center of the platform to facilitate driving onto the apparatus by a vehicle. The bottom is mostly flat but has a series of indentations within which to hold/cradle ball bearings. In one embodiment, these indentations are circular about the center of the platform forming concentric circles. However, the indentations might also use some other pattern or random placement.

The top of the outer platform has a large circular opening within which the inner platform operates. The top also has a circular gear at the outer edge of the circular opening. This circular gear meshes with a drive shaft gear from the inner platform. There is also a recoil device fixed in the center of the bottom of the outer platform that is attached to the center point of the inner platform as well. This recoil device operates to return the inner platform to its original rest position after the vehicle has exited the apparatus.

The inner platform is circular and fits within the circular opening of the outer platform. Like the outer platform, the inner platform has a bottom, preferably made from sheet metal and a top portion made from plastic. The metal of the bottom of the inner platform provides a smooth surface that comes into contact with the ball bearings of the outer platform and facilitates the rotation of the inner platform within the outer platform. Within the inner platform, and rotatably attached thereto, are a pair of drive shafts. Each of these drive shafts has a drive gear attached to one end. These drive shafts roughly span a cord of the circular inner platform and are disposed such that the respective drive gears are at opposite ends of the cord. These drive gears come into contact with the large circular gear of the outer platform. Each of the respective shafts is held in place by a pair of displaced ball bearing casements with the ball bearing casements being fixedly attached to the inner platform.

Disposed on the top surface of the inner platform is an opening, preferably rectangular in shape, which allows access to a central portion of the drive shafts from the top of the apparatus. This opening allows the tires of the motorcycle to contact the shafts. When the tire contacts the drive shafts and the operator of the motorcycle applies power to the wheels, the tires turn and translate power to the drive shafts. As the drive shafts rotate, the drive gears likewise turn and mesh with the large circular gear of the outer platform. This movement results in the rotation of the inner platform.

As noted above, the recoil device is fixed to the center of the outer platform and is also attached to the center of the inner platform. The function of the recoil is to return the apparatus from the final loaded position where the rectangular opening in the inner platform is furthest from the point where the motorcycle first drives onto the apparatus to the rest position where the rectangular opening in the inner platform is closest to the point where the motorcycle first drives onto the apparatus. As the motorcycle translates power to the apparatus facilitating the turn, the recoil builds up some recoil spring energy. When the motorcycle exits the apparatus, a trigger is released that unloads the recoil spring energy. This unloading provides energy that returns the motorcycle to the rest position. This trigger that releases the recoil may be a manual trigger required to be actuated by the operator of the motorcycle. The trigger may be a switch that is automatically actuated by the motorcycle when exiting the apparatus. The trigger may also be actuated by the decreased weight on the apparatus after the motorcycle exits. In each of these cases, when the motorcycle exits, the recoil operates to return the apparatus to the rest position.

In alternate embodiments, a set of fixable castors are located on the outer edges of the outer platform. These castors may be fixed to prevent movement when the apparatus is in use. Likewise, the castors may be placed into an operable position when the operator desires to move the apparatus.

In still another alternate embodiment, the invention includes a wall mounted connector that allows the apparatus to be lifted from the floor or ground to a wall for storage when not in use.

What is claimed is:

1. A portable personal vehicle turntable apparatus comprising:
   an outer platform, said outer platform further comprising a bottom layer and a top layer fixedly attached to each other, said bottom layer of said outer platform further comprising a plurality of indentations for cradling a plurality of ball bearings, said top layer further comprising an outer edge and a large circular opening, said outer edge of said top layer of said outer platform being sloped upward towards the center of the apparatus and said large circular opening further comprising a circular gear;
   an inner platform having a circular shape and a diameter smaller than the diameter of the large circular opening of the top layer of the outer platform, said inner platform further comprising a bottom layer and a top layer fixedly attached to each other, said bottom layer of the inner platform comprising a smooth lower surface for contact with the ball bearings of the bottom layer of the outer platform, said top layer of the inner platform comprising a rectangular opening;
   a pair of parallel drive shafts rotatably attached to said inner platform, a portion of said parallel drive shafts being accessible through said rectangular opening of said top layer of the inner platform such that the rear tire of a personal vehicle may contact each drive shaft of said pair of parallel drive shafts;
   a pair of drive shaft gear heads fixedly attached to the pair of parallel drive shafts wherein each drive shaft has one and only one drive shaft gear head, for meshing with the circular gear of the circular opening of the top layer of the outer platform; and
   a recoil mechanism, operating from a rest to a loaded position, fixedly attached to the center of the bottom layer of the outer platform and rotatably attached to the inner platform, said recoil mechanism further comprising a recoil spring, said recoil spring having a spring constant that allows the inner platform to reverse one hundred eight degrees, from the loaded position to the rest position, when a personal vehicle has exited the apparatus, and a trigger that releases said recoil spring thereby initiating the return to the rest position from the loaded position.

2. The portable personal vehicle turntable of claim 1 wherein the circular gear of the top layer of the outer platform is made of a molded plastic and is molded so as to be integral with the outer platform and wherein the pair of drive shaft gear heads are also made of molded plastic.

3. The portable personal vehicle turntable of claim 1 wherein the circular gear of the top layer of the outer platform, the pair of parallel drive shafts, and the pair of drive shaft gear heads are all made of metal.

4. The portable personal vehicle turntable apparatus of claim 3 wherein the plurality of indentations of the bottom layer of the outer platform are arranged in a plurality of concentric circles about the center of the outer platform.

5. The portable personal vehicle turntable apparatus of claim 3 wherein the plurality of indentations of the bottom layer of the outer platform are arranged in a random pattern.

6. The portable personal vehicle turntable of claim 4 wherein the outer platform is rectangular.

7. The portable personal vehicle turntable of claim 4 wherein the outer platform is circular.

8. The portable personal vehicle turntable of claim 4 wherein the bottom layer of the outer platform is made of metal and the top layer of the outer platform is made of plastic.

9. The portable personal vehicle turntable of claim 8 wherein the bottom layer of the inner platform is made of metal and the top layer of the inner platform is made of plastic.

10. The portable personal vehicle turntable of claim 9 wherein the circular gear of the top layer of the outer platform and the pair of drive shaft gear heads form a hypoid gear combination.

11. The portable personal vehicle turntable of claim 9 wherein the circular gear of the top layer of the outer platform and the pair of drive shaft gear heads form a worm gear combination.

12. The portable personal vehicle turntable of claim 5 wherein the outer platform is rectangular.

13. The portable personal vehicle turntable of claim 5 wherein the outer platform is circular.

14. The portable personal vehicle turntable of claim 5 wherein the bottom layer of the outer platform is made of metal and the top layer of the outer platform is made of plastic.

15. The portable personal vehicle turntable of claim 14 wherein the bottom layer of the inner platform is made of metal and the top layer of the inner platform is made of plastic.

16. The portable personal vehicle turntable of claim 15 wherein the circular gear of the top layer of the outer platform and the pair of drive shaft gear heads mesh to form a hypoid gear combination.

17. The portable personal vehicle turntable of claim 15 wherein the circular gear of the top layer of the outer platform and the pair of drive shaft gear heads mesh to form a worm gear combination.

* * * * *